(12) United States Patent
Eldering et al.

(10) Patent No.: US 8,677,401 B2
(45) Date of Patent: Mar. 18, 2014

(54) GROUPING ADVERTISEMENT SUBAVAILS

(75) Inventors: Charles A. Eldering, Doylestown, PA (US); Gregory C. Flickinger, Furlong, PA (US); John P. Blasko, New Hope, PA (US)

(73) Assignee: Prime Research Alliance E, Inc. (VG)

( * ) Notice: Subject to any disclaimer, the term of this patent is extended or adjusted under 35 U.S.C. 154(b) by 0 days.

(21) Appl. No.: 13/337,854

(22) Filed: Dec. 27, 2011

(65) Prior Publication Data

US 2012/0102512 A1    Apr. 26, 2012

Related U.S. Application Data

(63) Continuation of application No. 12/024,496, filed on Feb. 1, 2008, now Pat. No. 8,087,045, which is a continuation of application No. 09/750,812, filed on Dec. 28, 2000, now Pat. No. 7,331,057.

(51) Int. Cl.
*H04N 7/10* (2006.01)
*H04N 5/445* (2011.01)

(52) U.S. Cl.
USPC ............... 725/36; 725/32; 725/42; 725/46

(58) Field of Classification Search
USPC .................... 725/32, 34–36, 42, 46
See application file for complete search history.

(56) References Cited

U.S. PATENT DOCUMENTS

| | | |
|---|---|---|
| 4,930,011 A | 5/1990 | Kiewit |
| 4,974,252 A | 11/1990 | Osborne |
| 5,029,014 A | 7/1991 | Lindstrom |
| 5,099,319 A | 3/1992 | Esch et al. |
| 5,155,591 A | 10/1992 | Wachob |
| 5,231,494 A | 7/1993 | Wachob |
| 5,271,626 A | 12/1993 | Llenas et al. |
| 5,319,455 A | 6/1994 | Hoarty et al. |
| 5,400,166 A | 3/1995 | Huber |
| 5,410,344 A | 4/1995 | Graves et al. |

(Continued)

FOREIGN PATENT DOCUMENTS

| | | |
|---|---|---|
| CA | 2164608 | 12/1994 |
| CA | 2264392 | 1/1999 |

(Continued)

OTHER PUBLICATIONS

AdLink Engineering, Ad Insertion Wiring Diagrams, 1999, 17 pages.

(Continued)

*Primary Examiner* — Kieu Oanh T Bui
(74) *Attorney, Agent, or Firm* — The Belles Group, P.C.

(57) ABSTRACT

Method and system for creating one or more advertising avail sections (subavails) and thereupon aggregating the subavails to form one or more groups of subavails. The advertisement opportunities (avails) may be divided into sections (subavails) with each section being directed at a particular target audience (group). The subavails are then aggregated into one or more groups of subavails so that the groups of subavails can be sold to the advertisers. The grouping of subavails is generally based on a correlation wherein the subavails are characterized based on one or more characteristics. The groups of subavails are formed based on one or more shared characteristics. The advertiser has an option to buy a group of subavails (rather than an avail in prior art), whereby the advertiser may reach a targeted group of an audience.

11 Claims, 4 Drawing Sheets

(56) References Cited

U.S. PATENT DOCUMENTS

| | | |
|---|---|---|
| 5,424,770 A | 6/1995 | Schmelzer et al. |
| 5,446,919 A | 8/1995 | Wilkins |
| 5,457,562 A | 10/1995 | Tremblay |
| 5,532,732 A | 7/1996 | Yuen et al. |
| 5,534,911 A | 7/1996 | Levitan |
| 5,559,549 A | 9/1996 | Hendricks et al. |
| 5,574,860 A | 11/1996 | Perlman et al. |
| 5,592,551 A | 1/1997 | Lett et al. |
| 5,600,364 A | 2/1997 | Hendricks et al. |
| 5,600,366 A | 2/1997 | Schulman |
| 5,600,573 A | 2/1997 | Hendricks et al. |
| 5,612,742 A | 3/1997 | Krause et al. |
| 5,621,728 A | 4/1997 | Lightfoot et al. |
| 5,636,346 A | 6/1997 | Saxe |
| 5,650,994 A | 7/1997 | Daley |
| 5,652,615 A | 7/1997 | Bryant et al. |
| 5,661,516 A | 8/1997 | Carles |
| 5,724,091 A | 3/1998 | Freeman et al. |
| 5,724,521 A | 3/1998 | Dedrick |
| 5,752,160 A | 5/1998 | Dunn |
| 5,752,238 A | 5/1998 | Dedrick |
| 5,758,328 A | 5/1998 | Giovannoli |
| 5,761,601 A | 6/1998 | Nemirofsky et al. |
| 5,774,170 A | 6/1998 | Hite et al. |
| 5,794,210 A | 8/1998 | Goldhaber et al. |
| 5,801,747 A | 9/1998 | Bedard |
| 5,801,753 A | 9/1998 | Eyer et al. |
| 5,808,694 A | 9/1998 | Usui et al. |
| 5,815,671 A | 9/1998 | Morrison |
| 5,835,896 A | 11/1998 | Fisher et al. |
| 5,886,731 A | 3/1999 | Ebisawa |
| 5,905,975 A | 5/1999 | Ausubel |
| 5,917,830 A | 6/1999 | Chen et al. |
| 5,926,205 A | 7/1999 | Krause et al. |
| 5,931,901 A | 8/1999 | Wolfe et al. |
| 5,948,061 A | 9/1999 | Merriman et al. |
| 5,956,088 A | 9/1999 | Shen et al. |
| 5,966,120 A | 10/1999 | Arazi et al. |
| 5,969,715 A | 10/1999 | Dougherty et al. |
| 5,990,927 A | 11/1999 | Hendricks et al. |
| 6,002,393 A | 12/1999 | Hite et al. |
| 6,002,394 A | 12/1999 | Schein et al. |
| 6,006,257 A | 12/1999 | Slezak |
| 6,009,409 A | 12/1999 | Adler et al. |
| 6,009,410 A | 12/1999 | LeMole et al. |
| 6,020,880 A | 2/2000 | Naimpally |
| 6,020,883 A | 2/2000 | Herz et al. |
| 6,023,686 A | 2/2000 | Brown |
| 6,026,368 A | 2/2000 | Brown et al. |
| 6,026,369 A | 2/2000 | Capek |
| 6,029,045 A | 2/2000 | Picco et al. |
| 6,038,256 A | 3/2000 | Linzer et al. |
| 6,055,510 A | 4/2000 | Henrick et al. |
| 6,058,379 A | 5/2000 | Odom et al. |
| 6,061,097 A | 5/2000 | Satterfield |
| 6,088,722 A | 7/2000 | Herz et al. |
| 6,119,098 A | 9/2000 | Guyot et al. |
| 6,141,010 A | 10/2000 | Hoyle |
| 6,144,653 A | 11/2000 | Persson et al. |
| 6,160,570 A | 12/2000 | Sitnik |
| 6,161,099 A | 12/2000 | Harrington et al. |
| 6,177,931 B1 | 1/2001 | Alexander et al. |
| 6,181,334 B1 | 1/2001 | Freeman et al. |
| 6,253,189 B1 | 6/2001 | Feezell et al. |
| 6,253,238 B1 | 6/2001 | Lauder et al. |
| 6,263,501 B1 | 7/2001 | Schein et al. |
| 6,359,902 B1 | 3/2002 | Putzolu |
| 6,378,130 B1 | 4/2002 | Adams |
| 6,418,122 B1 | 7/2002 | Schoenblum et al. |
| 6,425,131 B2 | 7/2002 | Crandall et al. |
| 6,434,747 B1 | 8/2002 | Khoo et al. |
| 6,446,082 B1 | 9/2002 | Arita |
| 6,446,261 B1 | 9/2002 | Rosser |
| 6,459,427 B1 | 10/2002 | Mao et al. |
| 6,463,585 B1 * | 10/2002 | Hendricks et al. ............... 725/35 |
| 6,487,721 B1 | 11/2002 | Safadi |
| 6,493,875 B1 | 12/2002 | Eames et al. |
| 6,505,169 B1 | 1/2003 | Bhagavath et al. |
| 6,516,002 B1 | 2/2003 | Huang et al. |
| 6,583,825 B1 | 6/2003 | Yuen et al. |
| 6,615,039 B1 | 9/2003 | Eldering |
| 6,631,523 B1 | 10/2003 | Matthews, III et al. |
| 6,675,385 B1 | 1/2004 | Wang |
| 6,684,194 B1 | 1/2004 | Eldering et al. |
| 6,698,020 B1 | 2/2004 | Zigmond et al. |
| 6,704,930 B1 | 3/2004 | Eldering et al. |
| 6,718,551 B1 | 4/2004 | Swix et al. |
| 6,724,974 B2 | 4/2004 | Naruto et al. |
| 6,738,978 B1 | 5/2004 | Hendricks et al. |
| 6,796,555 B1 | 9/2004 | Blahut |
| 6,820,277 B1 | 11/2004 | Eldering |
| 7,150,030 B1 | 12/2006 | Eldering |
| 7,168,084 B1 | 1/2007 | Hendricks et al. |
| 7,185,353 B2 | 2/2007 | Schlack |
| 7,673,315 B1 | 3/2010 | Wong et al. |
| 2001/0013124 A1 | 8/2001 | Klosterman et al. |
| 2001/0032333 A1 | 10/2001 | Flickinger |
| 2002/0026645 A1 | 2/2002 | Son et al. |
| 2002/0038455 A1 | 3/2002 | Srinivasan et al. |
| 2002/0055880 A1 | 5/2002 | Unold et al. |
| 2002/0073419 A1 | 6/2002 | Yen et al. |
| 2002/0083442 A1 | 6/2002 | Eldering |
| 2002/0104083 A1 | 8/2002 | Hendricks et al. |
| 2002/0129374 A1 | 9/2002 | Freeman et al. |
| 2002/0152471 A1 | 10/2002 | De Haas |
| 2002/0188943 A1 | 12/2002 | Freeman et al. |
| 2003/0093790 A1 | 5/2003 | Logan et al. |
| 2003/0200128 A1 | 10/2003 | Doherty |
| 2004/0163101 A1 | 8/2004 | Swix et al. |

FOREIGN PATENT DOCUMENTS

| | | |
|---|---|---|
| CA | 2151458 | 2/2004 |
| EP | 1220542 | 7/2002 |
| WO | WO9712486 | 4/1997 |
| WO | WO9717774 | 5/1997 |
| WO | WO9827723 | 6/1998 |
| WO | WO9926415 | 5/1999 |
| WO | WO9952285 | 10/1999 |
| WO | WO9955066 | 10/1999 |
| WO | WO9965237 | 12/1999 |
| WO | WO9966719 | 12/1999 |
| WO | WO0049801 | 8/2000 |
| WO | WO0054504 | 9/2000 |
| WO | WO0064166 | 10/2000 |
| WO | WO0069163 | 11/2000 |
| WO | WO0147279 | 6/2001 |

OTHER PUBLICATIONS

NCTA Technical Papers "Compressed Digital Insertion: New Technology Architectures for the Cable Advertising Business", 1992, 8 pages.

U.S. Appl. No. 09/635,539, filed Aug. 10, 2000, Eldering, Charles A.

U.S. Appl. No. 09/635,542, filed Aug. 10, 2000, Eldering, Charles A.

* cited by examiner

GROUPING ADVERTISEMENT SUBAVAILS

CROSS REFERENCE TO RELATED APPLICATION

This application is a continuation of U.S. patent application Ser. No. 12/024,496, filed Feb. 1, 2008 now U.S. Pat. No. 8,087,045, entitled Grouping Advertisement Subavails, which is a continuation of U.S. patent application Ser. No. 09/750,812, (now U.S. Pat. No. 7,331,057), filed Dec. 28, 2000, entitled Grouping Advertisement Subavails, the entire disclosures of which are incorporated herein by reference.

BACKGROUND OF THE INVENTION

Advertising plays an important role in the broadcast programming industry. The costs of programming are either subsidized by advertisements or paid for entirely by advertisements, as in the case of over-the-air broadcasting. Furthermore, monthly cable subscription can be affected by the revenues from advertisements.

The technology for advertisement insertion has been around for quite some time. Primarily, network broadcasters, both local and national, divide their airtime into two categories. First, there is "programming," reserved for informational broadcasting and entertainment. Secondly, "avails" are reserved for advertising. These advertising avails may account for as much as 20-25% of total transmitting time. Usually, these avails are divided into smaller intervals of 15, 30, up to 60 seconds.

In many prior art systems, the insertion of advertisements in avails is handled by a combination of cue-tone detectors, switching equipment and tape players, which hold the advertising material. Upon receipt of the cue tones, an insertion controller automatically turns on a tape player containing the advertisement. Switching equipment then switches the system output from the video and audio signals received from the programming source to the output of the tape player. The tape player remains on for the duration of the advertising, after which the insertion controller causes the switching equipment to switch back to the video and audio channels of the programming source. When switched, these successive program and advertising segments usually feed to a radio-frequency (RF) modulator for delivery to the subscribers.

Many subscriber television systems, such as cable television, are currently being converted to digital equipment. These new digital systems compress the advertising data, e.g., using Motion Picture Experts Group 2 (MPEG 2) compression, store the compression data as a digital file on a large disk drive (or several drives), and then, upon receipt of the cue tone, spool ("play") the file off of the drive to a decoder. The video and accompanying audio data are decompressed back to a standard video and audio, and switched into the video/audio feed of the RF modulator for delivery to the subscriber. This comprises the insertion of digitally stored material into an analog stream.

Alternatively, the video delivery system may be entirely digital, in which case the ads may be spooled from the drive and inserted directly into a digital programming stream, where decoding takes place at the set-top box in the subscriber residence. This is the case for digital-into-digital insertion.

A prior art (present model) of providing advertisements along with actual programming is based on linked sponsorship. In the linked sponsorship model, the advertisements are inserted into the actual programming based on the demographic information related to the viewer/subscribers. However, the ability to transmit information digitally allows programming and advertisements to be transported from various geographic locations and arranged in a fashion which permits an optimized program to be presented to a subscriber.

The transition to the digital age permits a migration to new methods of advertising based on what is termed orthogonal sponsorship. In orthogonal sponsorship, the advertisements are targeted at subscribers based on a determination that the advertisement will be of interest to the subscriber and that the subscriber is likely to ultimately purchase the product or service being advertised.

In addition, with the advent of digital technology, the migration to digital media including digital video will allow for the targeting of advertisements, and in particular, will allow for the targeting of advertisements down to the individual level. Although such granularity allows for the very precise targeting of advertisements, management and in particular the sales of advertisements, can be very difficult due to the sheer number of advertising opportunities which are created in the digital environment.

As an example, in targeted television advertising it is possible to deliver advertisements to small geographic groups over traditional Hybrid Fiberoptic Coaxial (HFC) systems, and to individual homes in Switched Digital Video (SDV) systems. In SDV systems, algorithms have been developed to aggregate homes into groups which allow for targeting to groups, rather than to individual homes. Nevertheless, the increased inventory of avails is difficult to manage and sell. What is needed is a method and system for creating groups of avail sections which are manageable.

SUMMARY OF THE INVENTION

The present invention is a method and system for creating one or more advertising avail sections (subavails) and thereupon aggregating the subavails to form one or more groups of subavails.

In accordance with the principles of the present invention, the advertisement opportunities (avails) may be divided into sections (subavails) with each subavail being directed at a particular target audience (group). The subavails are then aggregated into one or more groups of subavails so that the groups of subavails can be sold to the advertisers. The grouping of subavails is generally based on a correlation, wherein the subavails are characterized based on one or more characteristics. The groups of subavails are formed based on one or more shared characteristics. The advertiser has an option to buy a group of subavails (rather than an avail in prior art), whereby the advertiser may reach a targeted group of an audience.

It is to be noted that subavails are based on virtual partitions, i.e., an avail need not be partitioned/spliced to create subavails. Instead, the subavails may only refer to various advertisement opportunities in different presentation streams. For example, if an ESPN program stream is split into n streams labeled as ESPN1, ESPN2, ESPN3-ESPNn (each ESPN stream targeted at a subgroup of subscribers), then the subavail may only refer to an advertisement opportunity in one of the ESPN1, ESPN2-ESPNn streams, wherein an avail refers to an advertisement opportunity to all streams of ESPN.

In the present invention, one or more subavails across a plurality of channels may be grouped to form a particular target group. For example, a target group A may appear in avails which span a number of channels. In one embodiment of the invention, the avail sections are aggregated across channels to form a group of cross-networked subavails. The advantage of the grouped cross-network subavail group is that it allows the buyer to reach the same number of viewers by purchasing a single avail, but with targeting the advertisement. The advertiser can make a single purchase rather than having to buy a number of subavails.

In an alternate embodiment, one or more groups of time sequence subavails are formed by taking subavails over a period of time on a single channel. As in the previous embodiment, the group of time sequence subavails can be readily sold because it allows the buyer to reach a suitable number of subscribers and allows the purchase of a group of subavails (comprising many subavails) rather than the purchase of a few avails or the purchase of many subavails.

In the present invention, the subavails may be described in terms of "addressable units." In addition to demographic characteristics, the addressable unit will have "subscriber size," e.g., one household for SDV, 125-150 households in cable nodes. In the case of cable nodes, the addressable unit has a statistical distribution of each demographic factor. The demographic factors may be basic, e.g., age, sex, household income, etc., or value-added, such as clusters or other third party groupings familiar to the media buyer.

An advertisement management system (AMS) is further described in the present invention to define how the advertising avails are broken into addressable units and offered to the media buyer and delivered to subscribers.

BRIEF DESCRIPTION OF THE DRAWINGS

The accompanying drawings, which are incorporated in and form a part of the specification, illustrate the embodiments of the present invention, and together with the description, serve to explain the principles of the present invention.

In the drawings.

DETAILED DESCRIPTION OF THE PREFERRED EMBODIMENT

Figure 1:
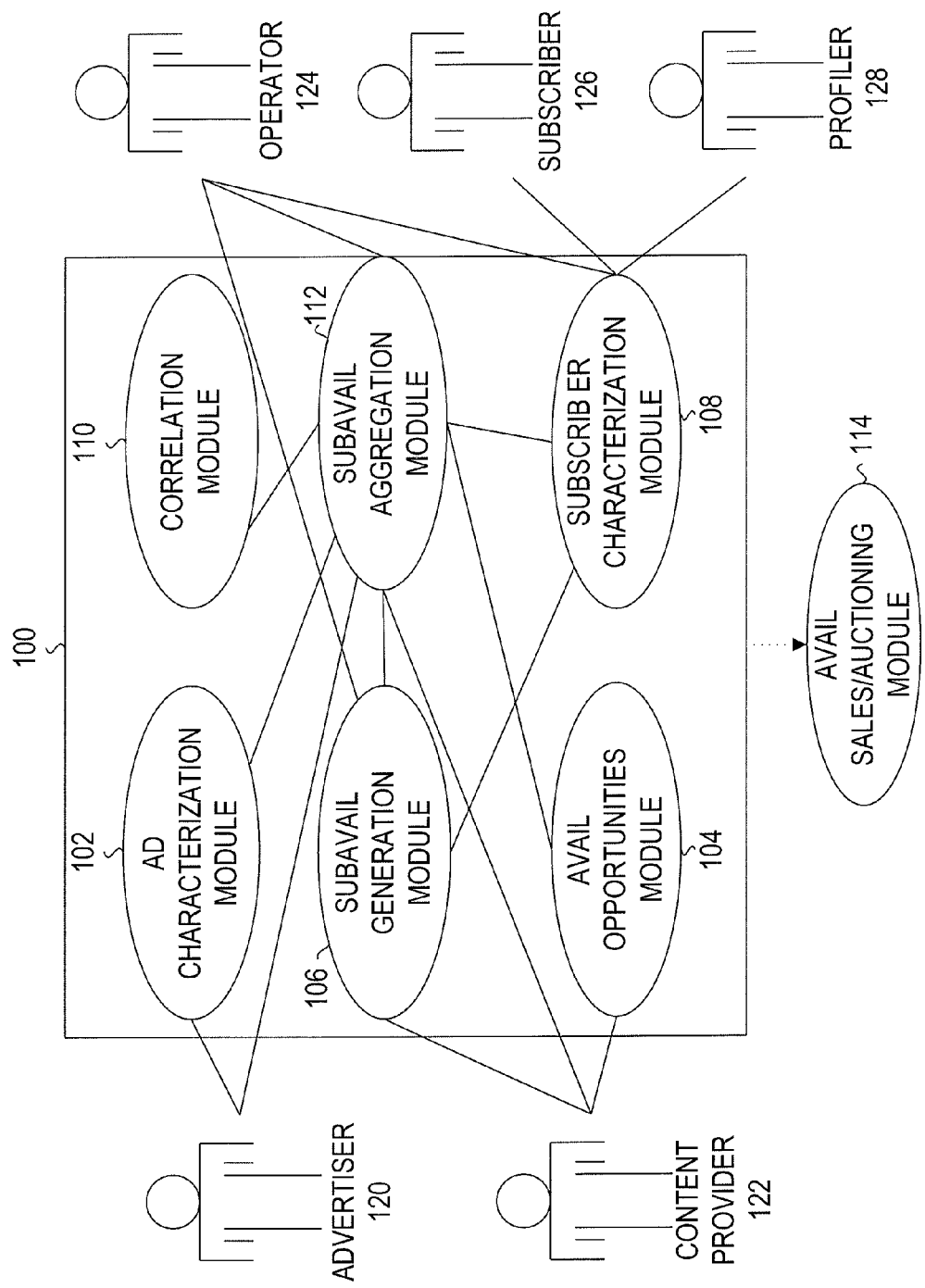
FIG. 1 illustrates an advertisement management system (AMS), in accordance with the embodiments of the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. These and other features and objects of the present invention will be understood more fully from the following detailed description of the preferred embodiments, which should be read in light of the accompanying drawings.

With reference to the drawings, in general, and FIGS. 1 through 4 in particular, the apparatus of the present invention is disclosed.

Generally, an advertisement management system (AMS) in accordance with the principles of the present invention, consists of one or more subsystems which allow for the characterization of an advertisement (ad), the determination of advertising opportunities (avails), the characterization of a subscriber, the creation of subavails, the correlation and aggregation of different subavails to form one or more groups of subavails and the sale of one or more groups of subavails.

As illustrated in FIG. 1, the AMS 100 comprises an ad characterization module 102, an avail opportunities recognition module 104, a subavail generation module 106, a subscriber characterization module 108, a correlation module 110, and a subavail aggregation module 112. The AMS 100 is also configured to communicate to an avail sales/auctioning module 114, and to an ad insertion module (not shown). It should be noted that the ad insertion module may be located within the AMS 100 or may be located externally. Furthermore, the modules of the AMS 100 interact with an advertiser 120, a content provider 122, an operator 124, a subscriber 126, and a profiler 128.

The ad characterization module 102 allows one or more advertisers 120 to enter key characterization data regarding the ad and the target market. The avail opportunities module 104 allows the content providers/producers of program streams 122 to indicate various avails that are available in the programming stream, their basic characteristics, and the extent to which they can be substituted. The subavail generation module 106 permits the content providers 122 to describe the available advertising opportunities ("avails") into a plurality of sections (subavails) wherein each subavail is being directed at a particular target audience (group).

The subscriber characterization module 108 allows for the collection of subscriber data. The subscriber data can be collected from a variety of sources including private databases external to the system or public databases that contain information relevant to the subscriber 126.

With respect to private data, the subscriber 126 has generally paid for the access to this data, e.g., the subscriber 126 may receive product promotions or other offers. The subscriber 126 is also provided access to his private data. The subscriber 126 may have access to his private data to assure the integrity of the data, e.g., the data accurately reflects his interests and lifestyle.

The subscriber data may be based on an individual subscriber, a group of subscribers, a household or a group of households. Techniques evolving the coarse discrimination of subscribers and grouping of subscribers into large groups can be used to associate a serving area with a particular ad. For example, in a cable television system, it may be determined that a group of subscribers 126 associated with a particular optical distribution node, speak a particular language. This knowledge may then be used to direct a particular set of ads to that node. As an example, a node associated with Spanish-speaking subscribers can have ads in Spanish inserted in the programming streams.

The specific targeting can also be based on public information, such as median home prices or starter home prices. These prices can be further associated with zip codes. The publicly available data may be subscriber specific. For example, tax assessment data may be used as a factor in determining the applicability of an ad. In the case of tax assessment data, the subscriber's 126 name, address and tax parcel number are known along with an assessed value of the property. The assessed value of the property can be used to determine an approximate income range for the family and thus specifically target ads.

Publicly available data is not restricted to real estate data, but can include a variety of demographic data including median household age, household income, race and other characteristics which can be determined on a group or individual level.

Private data can also be amassed and can include specific viewing habits or purchase records of the subscriber 126. Alternatively, the subscriber 126 may complete questionnaires and forms that indicate lifestyle, product preference and previous purchases. All of the available private and public information is used by the subscriber characterization module 108 for characterizing one or more subscribers 126. The subscriber characteristics may be based upon some known features. For example, it is known that the Nielsen data tracks the number of households watching particular television programming. In accordance with the principles of the present invention, such information may be used to characterize one or more characteristics of the subscribers 126.

The ad characterization module 102 has an advertiser interface, e.g., a Web (browser) interface, that allows advertisers 120 to enter parameters which characterize their ad and are used to form ad characterization vectors. The advertisers 120 may manually create ad characterization vectors by entering useful information via the browser interface. In this case, the ad characterization vector contains a simple deterministic value (0 and 1) for each category. Alternatively, the vectors may contain probabilistic distributions and may allow advertisers 120 to develop more complex models for the target market.

Furthermore, the ad characterization module 102 supports entry of the one or more parameters that are used by advertisers 120 to target the ad and create advertisement vectors. The choices for these parameters may be presented as pull down selections in a browser utilizing a graphical user interface (GUI). For example, categories such as ad duration, minimum ad bandwidth, household income, household size, median household age, and ethnic group may be used.

The subavail generation module 106 permits an operator 124 or a video-programming manager the ability to list and organize the particular avails in a programming stream as well as create one or more subavails based on each avail. The subavail generation module 106 comprises an interface that may be used for the manual entry of data, or may be used for the collection of avail data from network or other content related databases. The avail data may be used for the formation of one or more avail characterization vectors. These avail characterization vectors may be correlated with the ad characterization vectors to determine how avails should be divided into subavails. One or more heuristic rules may be defined for the generation of subavails. These heuristic rules may be expressed in terms of logical rules as well as conditional probabilities.

For example, the subavail generation module 106 may have a GUI and the operator 124 may be presented with several categories such as programming opportunity, avail duration, initial bandwidth, initial schedule broadcast time, local preemption authorized, household income, household size, median household age, and ethnic group.

The subscriber characterization module 108 provides the operator 124 with the ability to characterize the subscriber 126 (in SDV mode) or to characterize the node (in non-SDV mode). In a non-SDV mode, the operator 124 is presented with a node demographics interface that allows the operator 124 to manually program the node characteristics using pull-down menus, or to import the data from a file. The node characteristics are determined from information manually collected by the operator 124, or assembled using agents that collect the information from publicly available sources.

In the non-SDV mode, the node demographics interface presents both an input screen and a node characteristics screen; wherein the node characteristics screen further includes a graphical representation of the node demographics. Generally, a browser-based interface allows the operator 124 to analyze the input characteristics, and to characterize the node. The characteristics that are input and displayed include household income, household size, median household age, and ethnic group.

The browser-based interface also permits the subscriber characterization module 108 to fill in probabilistic values for each of the parameters. A pull down menu may be utilized with increments of 0.1, and a normalization error message may be generated if the operator 124 generates a series of values which, when summed, exceeds 1.0. If the operator 124 enters values that do not sum to 1.0, another normalization error message may be generated and displayed. For example, if the operator 124 characterizes the node as having equal probability of the household income being in any one of the ranges shown above, the value that must be entered in each category is 0.2.

In SDV mode, the operator 124 is presented with a subscriber information interface. By utilizing this interface, the system is capable of retrieving (based on a unique subscriber ID) demographic and product preference characteristics for each subscriber/household 126. Generally, to protect privacy, the subscriber's 126 private information is not used in the subscriber ID, therefore the subscriber 126 is not identifiable by the ID. The demographic and product preference characteristics may be stored locally or may be stored in one or more network databases configured to directly communicate with the AMS 100.

Information for a limited number of subscribers 126 may be stored and may be retrievable and displayable on the interface. The principal characteristics of the displayed subscriber information include household income, household size, median household age, and ethnic group. The subscriber characteristics may be determined in a plurality of ways including, utilizing the previously described public and private data.

The subavail aggregation module 112 gathers information about subavails and aggregates different subavails to generate one or more groups of subavails. The subavails may be aggregated by different methodologies. Some of these methodologies are described with reference to FIG. 2 and FIG. 3. The subavail generation module 106 directly communicates with the network operator 124 wherein the network operator 124 transmits instructions and sets the parameters that may be used to group one or more subavails.

The correlation module 110 correlates the ad characterization information with the subscriber/node characterization information to produce a demographic correlation, and also correlates the ad characterization information with the subavails information to produce an avail correlation. Generally, the correlation is computed between the ad and the groups of subavails. The correlation may be computed for individual subavails, but it is not recommended, as it can be cumbersome. Taking the dot product of the ad characterization vector with the subscriber/node characterization vector generally performs the correlation. Different correlation values are normalized such that the resulting correlation value is normalized to 1.0, with a value of 1.0 indicating that the maximum correlation has been obtained.

The correlation values may be calculated for each ad characterization vector and the corresponding subscriber/node characterization vector, as well as for each ad characterization vector and one or more groups of subavails. In one implementation, multiplying corresponding elements of the vector and summing the result (dot product) generates the correlations.

The avail sales/auctioning module 114 utilizes information regarding the subavails in conjunction with the results of the correlation to match ads with one or more groups of subavails and to complete the transaction. Generally, the avail sales/auctioning module 114 collects information about all subavail groups matching the basic time duration and bandwidth characteristics, along with the program they are presently linked to, and the combined correlation between the ad and the avail listed. The avail sales/auctioning module 114 also calculates the placement of the ads based on the degree of correlation and a pricing scheme. For example, a simple pricing scheme is utilized in which the price for the placement of the ad within an addressable unit depends linearly on the correlation. Also, the degree of correlation may be used to offer discounts to the advertisers 120, e.g., a correlation of 0.9 results in a 0% discount, and a correlation of 0.2 results in a 30% discount of the listed price. The advertiser 120 has no requirement to buy all the nodes that match a target correlation. The system may generate alternate sized groupings for different prices.

Figure 2:
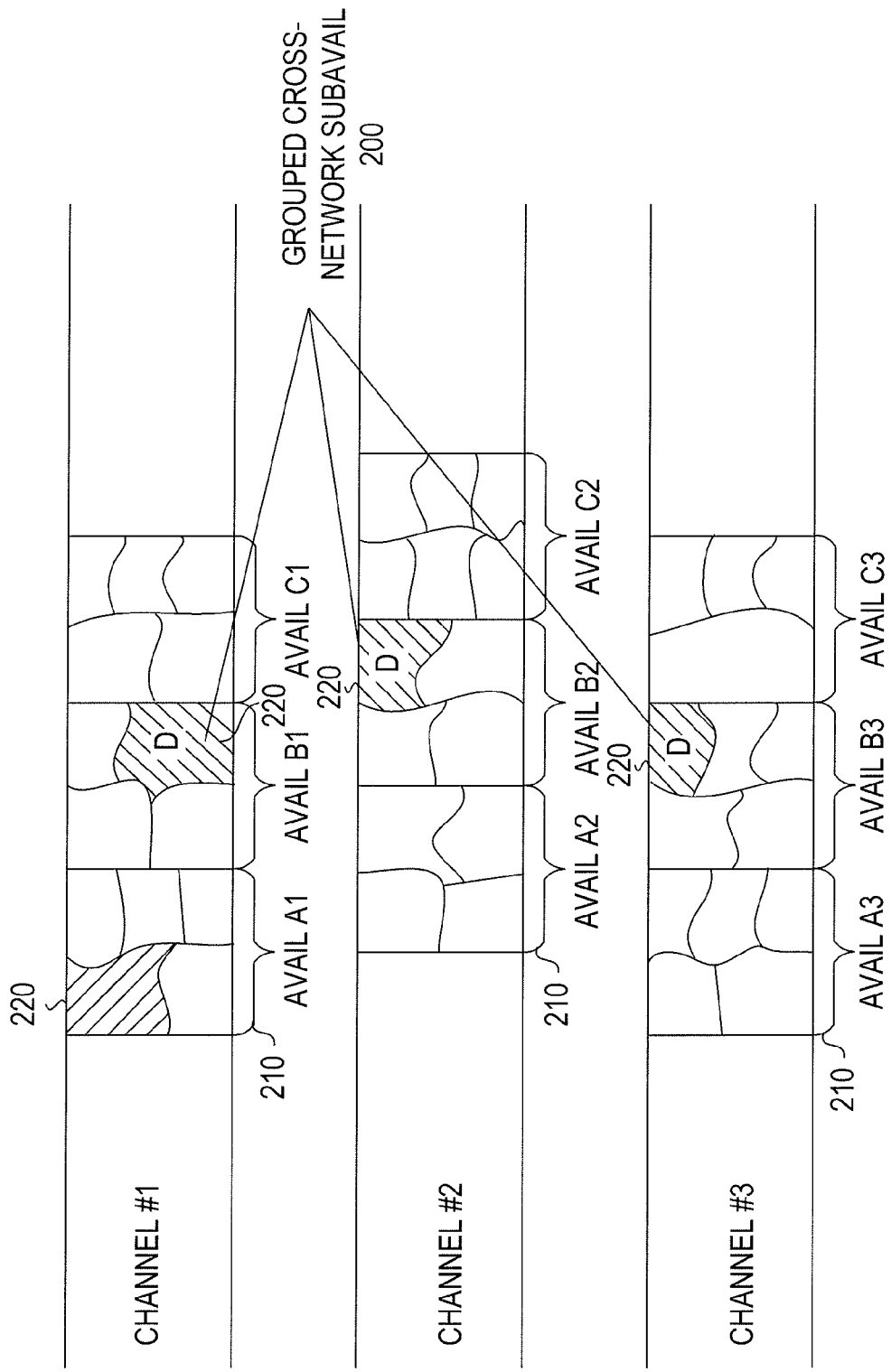
FIG. 2 illustrates one embodiment of the invention in which the avail sections are aggregated across channels to form a grouped cross-network subavail.
Figure 3:
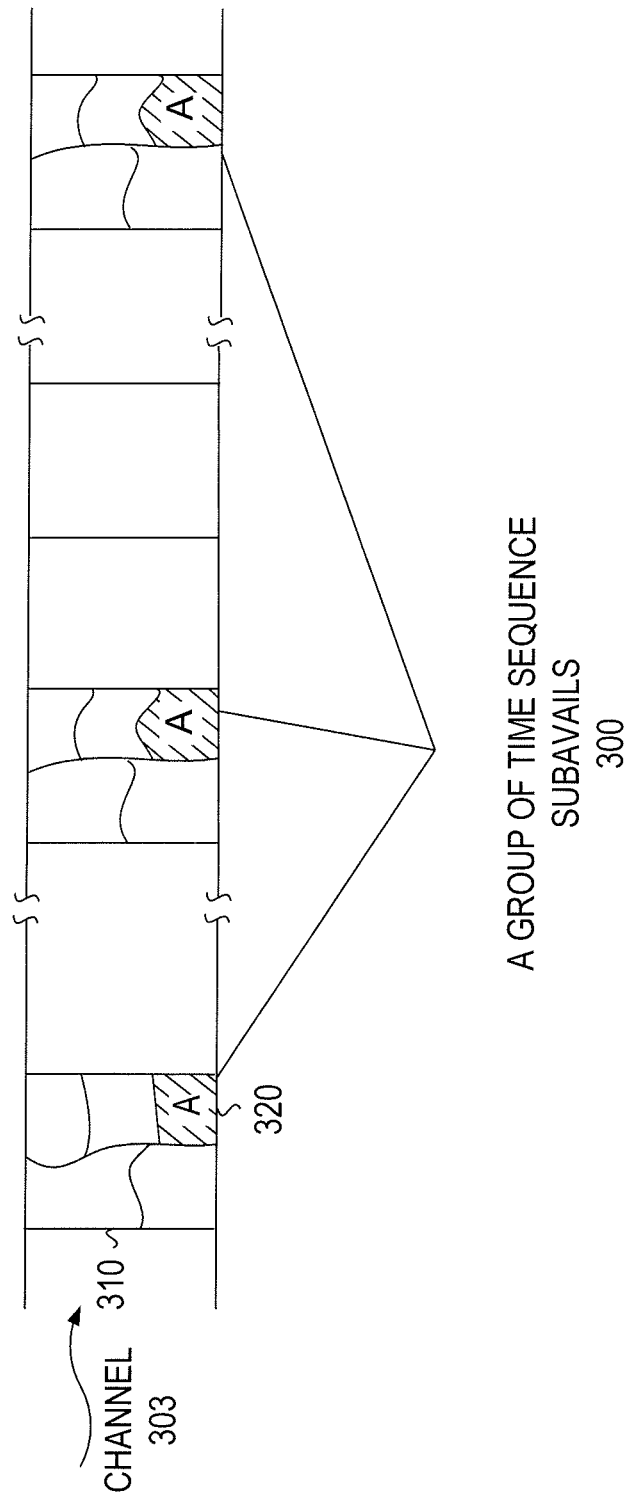
FIG. 3 illustrates another embodiment of the invention in which grouped time sequence avails are formed by taking subavails over a period of time on a single channel.

Once a grouping of addressable units, as shown in FIGS. 2 and 3, are generated, the system will correlate the grouping on the avail inventory (time of day and channel). The system may take the correlation data and optimize the choice of channel, etc. with the addressable unit selection. For example, there exists nodes that have a high concentration of a specific subscriber demographic that an advertiser 120 is targeting and there exists programs that the targeted subscriber 126 is more likely to watch. The price of the group of addressable units would change in respect to the group size of available (or designated) households and with the available inventory of addressable units.

The pricing scheme may further be utilized for the sale of avails in the form of addressable units by ranking the correlations of the avails and the ads in decreasing order as a function of the degree of correlation. When multiple ads are used with an avail, the ad with the highest correlation (and its corresponding price) is selected for placement in the avail. If multiple ads indicate the same degree of correlation, the first ad in the list is selected for placement in the avail. Furthermore, the revenues may be optimized by announcing avails to more than one advertiser 120, or by auctioning available avails to various advertisers 120 or ad sources.

FIG. 2 illustrates one embodiment of the invention, in which the avail sections are aggregated across channels to form one or more grouped cross-network subavails 200. As illustrated in FIG. 2, an avail 210 may be divided into a plurality of addressable units (subavails) 220 with each subavail 220 being directed at a particular target audience (group). In this embodiment, the subavail aggregation module 112 may aggregate different subavails 220 to create a grouped cross-network subavail 200 that may be targeted at a subscriber or a group of subscribers. For example, the correlation module may match each subavail 220 to the appropriate target group created by the AMS 100. It is to be noted that the grouped cross-network subavails 200 comprises one or more subavails 210 that span across a plurality of channels. Thus, the subavails 210 are aggregated across the various channels to form a grouped cross-network subavail 200. The advantage of the grouped cross-network subavail 200 is that it allows the advertiser 120 to reach the same number of subscribers 126 as by purchasing a group of avails 210, but with targeting a specific subscriber or a specific group of subscribers, wherein prior art, the advertiser 120 must purchase a single avail 210. The present invention is also advantageous as the advertiser 120 can make a single purchase rather than having to buy a number of (subavails) addressable units 220. For exemplary purposes, in FIG. 2, three different channels labeled as channel #1, channel #2, and channel #3 are shown, each channel having three avails 210. The avails 210 corresponding to channel #1 and shown as avail A1, avail B1, avail C1, and the avails 210 corresponding to channel #2 and channel #3 are shown to have avail A2, avail B2, avail C2 and avail A3, avail B3, avail C3 respectively. A group of cross-networked subavails 200 is formed by combining a subavail 220 of avail B1 from channel#1, avail B2, from channel#2 and avail B3 from channel#3.

FIG. 3 illustrates an alternate embodiment of the invention, in which one or more groups of time sequence subavails 300 are formed by taking addressable units (subavails) 320 over a period of time on a single channel 303. In this embodiment, one or more avails 310 are sectioned into a plurality of subavails 320. One or more groups of subavails 320 are formed by gathering sections of different avails 310 belonging to the same channel. As in the previous embodiment, one or more groups of time sequence subavails 300 can be readily sold because it allows the advertiser 120 to reach a suitable number of subscribers 126 and allows for the purchase of a single target group. For example, a group of time sequence subavails 300 rather than the purchase of many small subavails 320. For exemplary purposes, a group of time sequence subavails 300 is formed by combining a subavail 320 from each avail 310 available in a time sequence, each avail 310 corresponding to the same channel.

Figure 4:
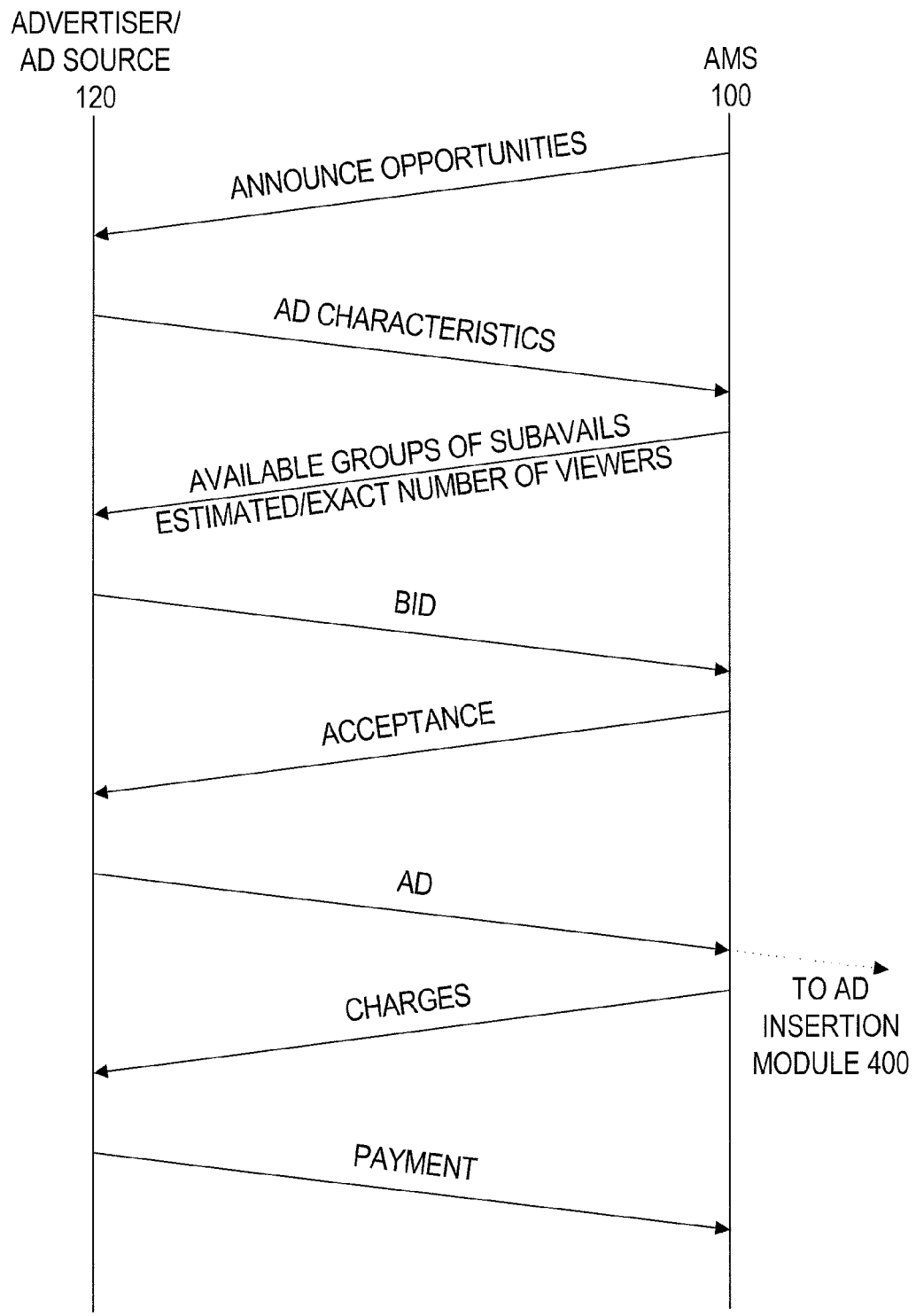
FIG. 4 illustrates an exemplary case wherein the Avail Sales/Auctioning module of an AMS announces the avail opportunities to various advertisers and ad sources.

FIG. 4 illustrates an exemplary case wherein the AMS 100 announces the opportunities relating to groups of subavails to various advertisers/ad sources 120. This announcement may be made via the Internet. The advertisers/ad sources 120 receive the announcement and respond with one or more ad characteristics that include information regarding the product/service advertised, the target market characteristics, the target programs, the addressable unit (subavail), the duration of the ad, and the minimum bandwidth required to transmit the ad.

Based on the received ad characteristics, the AMS 100 determines the characteristics of available addressable units (subavails) within the avail, including an estimated or exact number of subscribers. The AMS 100 may report a real-time report on the viewing audience (i.e., the number of subscribers at a time). In cable networks, the number of active subscribers (viewers) can be reported back to the AMS 100 (in real-time) by the use of a return path data modem in a set-top box (STB). In a SDV system, such as those based on various Digital Subscriber Line (xDSL), Fiber-To-The-Curb (FTTC), and Fiber-To-The-Home (FTTH) transmission technologies, the selection of the video programming occurs at the central office (CO), and it is possible for the system to determine the number of active viewers (subscribers) 126 of a program at any given moment. In an alternate implementation, the exact number of subscribers 126 is not determined and statistical information such as Nielsen data is reported to the advertisers 120.

Once information regarding the advertising opportunities (avails) has been transmitted to the advertiser 120, the advertisers 120 may submit appropriate bid/bids for the ad. The AMS 100 receives the bids, and after evaluation either accepts the bids or declines the bids. Multiple rounds of bidding may be utilized to insure that the AMS 100 receives the highest price for the ad.

Once the bidding process is complete, the AMS 100 transmits an acceptance notification to the requesting advertiser 120. The advertiser 120 then transmits the actual contents of the ad. The contents are then placed in a suitable format and sent to an ad insertion module 400 for insertion into the actual program streams in the appropriate set of addressable units (subavails). The ad may be multiplexed in a program stream (synchronously and asynchronously), or may be carried as an in-band, and/or out-of-band ad channel.

Once the ad has been inserted in a program stream in the appropriate set of subavails by the ad insertion module 400, the ad is transmitted to the subscriber 126 along with the actual program stream for viewing. Once the ad has been transmitted, the associated charges are billed to the advertiser 120 who in turn submits payment. A billing module may be added to handle the charges and the payments. In one embodiment, the charges and payments are transmitted electronically over the Internet. In an alternate embodiment, traditional methods of notification and payment (e.g. notification of charges via invoices and payment via check) may be used.

In a preferred embodiment, the AMS 100 is implemented on server-based technology. As an example, processors provided by the Intel Corporation under the trademark PENTIUM can be used in single or multiple processor configurations. The operating system offered by Microsoft Corporation under the trademark WINDOWS NT SERVER can be used as the basis for the platform. The AMS 100 can be realized in a software means in a number of programming languages, including but not limited to, Java, C and C++. In one embodiment the portions of the system which interface to the Internet are based on Java and Java scripts. The communications with advertisers 120 can take place by executing one or more Java scripts which exchange information between the AMS 100 and the advertisers 120. The operations of the unit may also be realized in C language.

At the subscriber 126 side, the programming and the target ads are received by a television, a STB, or a personal computer (PC) that decodes the multiplexed video programming, and displays it on a television or a monitor. The STB can be based on a cable television receiver including a microprocessor, and an MPEG video decompression device.

The system may also be configured to have the ability to utilize actual viewership information. In SDV systems, this information is readily available from the switching system (Broadband Digital Terminal) which is typically located in the telephone CO, but which may also be located in the field. In traditional cable systems, the viewership information may be collected in the television STB by monitoring the channel to which the subscriber 126 is tuned. This information is subsequently transmitted to the head end (HE) to provide the actual viewership information as opposed to the expected viewership. The data channel as specified in the Data Over Cable System Interface Specification (DOCSIS) can be used to transmit the viewership information to the HE or other location.

In another implementation, the AMS 100 is modified to add an ability to capture particular ads and to store those ads for later display. Generally, the ability to access ad databases is external to the AMS 100 and is maintained by the advertisers 120 themselves. These databases contain ad characterization vectors in standardized formats. However, in this implementation, an ability to extract avail information from MPEG video streams to determine avail parameters is added within the AMS 100. In this implementation, the ability to deliver ads in concentrated insertion systems and the ability to capture ads in real-time at ad insertion modules 400 is also included within the AMS 100.

Yet in one more implementation, the ability to selectively capture ads in each server, based on node/subscriber demographics or other Artificial Intelligence (AI) criteria is also added. In this implementation, the ads are automatically captured at a local server, and are presented for subsequent auctioning. One set of criteria that can be used is the correlation between the ad (based on an ad characterization vector, possibly transmitted with the ad) and the node/subscriber demographics. For example, the ads that are targeted for high-income households may be stored on local servers located in HEs serving high-income areas.

The system as described in various ways may be represented and modeled using primarily the Unified Modified Language (UML) which is well known to those of ordinary skill in the art. The UML and other diagrams together with the accompanying text can be used to implement the AMS 100.

Although the embodiments described herein enable one of ordinary skill in the art to implement (i.e. build) the AMS 100, it in no way restricts the method of implementation, the AMS 100 being capable of being implemented on a variety of hardware/software platforms with a variety of development languages, databases, communication protocols and frameworks as will be evident to those of ordinary skill in the art. Furthermore, the design represents only one set of business objects (classes) which can be coordinated to carry out the functionality and requirements of the AMS 100. Other designs comprising other sets of business classes and their coordinations could be constructed that also represent and conform to the requirements of the AMS 100, as will be evident to those of ordinary skill in the art.

Although this invention has been illustrated by reference to specific embodiments, it will be apparent to those of ordinary skill in the art that various changes and modifications may be made which clearly fall within the scope of the invention. The invention is intended to be protected broadly within the spirit and scope

What is claimed is:

1. In a television network environment, the television network environment being a cable-based system, a satellite-based system or a switched digital video system, a method of managing advertisement opportunities, the method comprising:
    recognizing one or more advertisement opportunities (avails) in a programming stream wherein each avail includes a time duration, bandwidth characteristics and a program linked to the avail;
    creating a plurality of addressable units (subavails) from the recognized avails, wherein each recognized avail is virtually partitioned into the plurality of addressable units (subavails) such that each subavail includes one or more of a subscriber size and a statistical distribution of demographic factors, and is directed at a particular target audience group; and
    aggregating the subavails to generate one or more groups of subavails.

2. The method of claim 1, further includes selling the groups of subavails to one or more prospective advertisers.

3. The method of claim 2, further comprises:
    receiving one or more bids for each group of subavails; and
    selling the group of subavails to the highest bidder.

4. The method of claim 1, further comprising:
    gathering one or more subscriber characteristics of the target audience group; and
    correlating the subscriber characteristics to the groups of subavails.

5. The method of claim 4, further includes determining pricing for the groups of subavails based on the correlation.

6. The method of claim 5, further includes selling the groups of subavails based on the determined pricing.

7. The method of claim 4, further comprising:
    transmitting the correlation results to one or more prospective advertisers;
    receiving one or more bids for each group of subavails; and
    selling the group of subavails to the highest bidder.

8. The method of claim 4, further comprising:
receiving information about one or more advertisements to be placed in the subavails;
characterizing the advertisements; and
correlating the advertisements and the subscriber groups, whereby the advertisements are inserted in the subavails based on the correlation.

9. The method of claim 1, wherein the subavails are grouped by combining a plurality of subavails across different channels.

10. The method of claim 9, wherein the subavails are gathered from the same channel.

11. The method of claim 1, wherein the subavails are grouped by combining a plurality of time-sequenced subavails.

* * * * *